April 21, 1936.   A. GUDMUNDSEN   2,038,171
WATER COOLING AND TREATING APPARATUS
Filed June 22, 1933
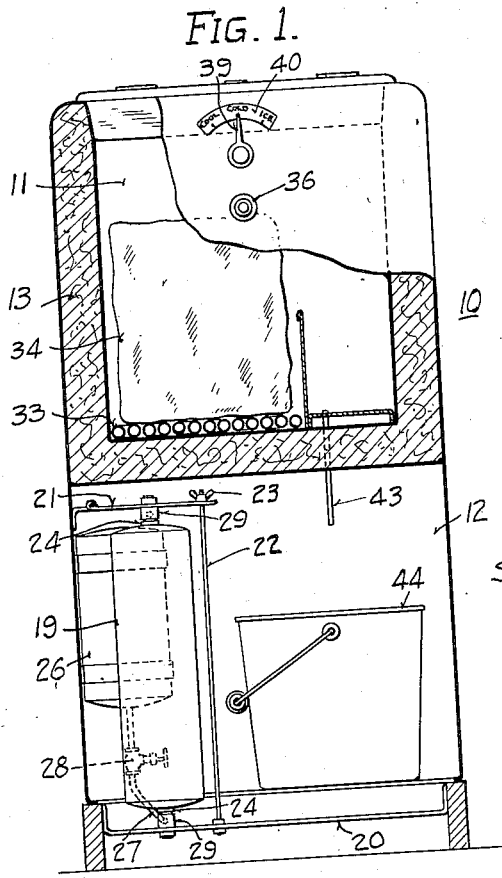
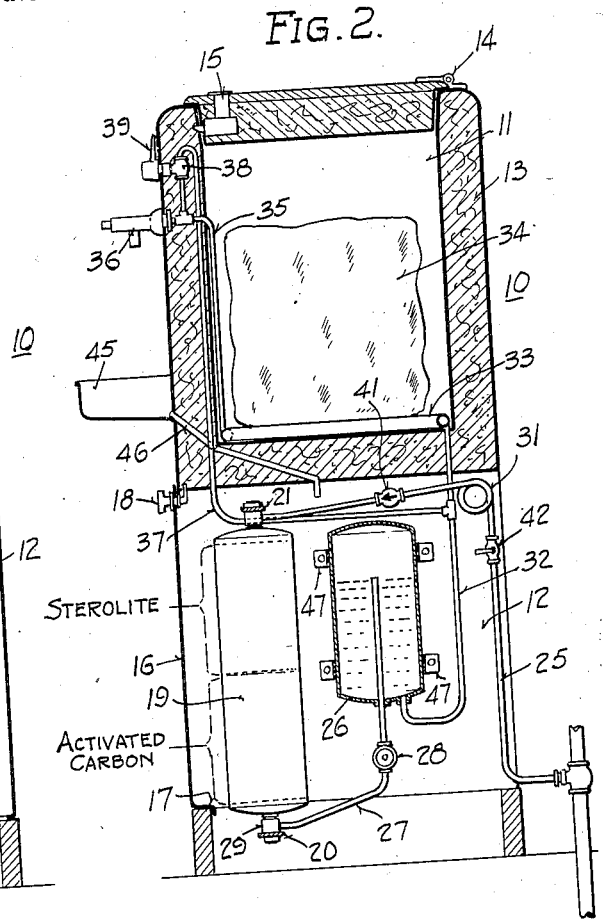
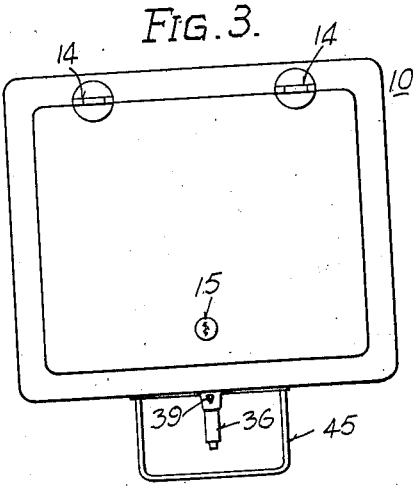
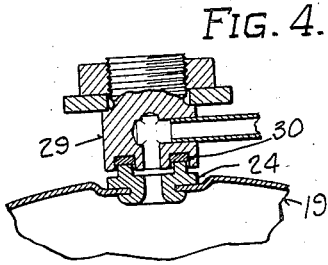
INVENTOR.
Austin Gudmundsen
BY Ezra W. Savage
ATTORNEY.

Patented Apr. 21, 1936

2,038,171

UNITED STATES PATENT OFFICE 2,038,171

WATER COOLING AND TREATING APPARATUS

Austin Gudmundsen, Milwaukee, Wis.

Application June 22, 1933, Serial No. 677,011

7 Claims. (Cl. 62—41)

The invention relates generally to water cooling and treating apparatus.

The object of the invention, generally stated, is to provide water cooling and treating apparatus that is simple and efficient in operation and readily and economically manufactured.

A more specific object of the invention is to provide for storing filtered water under pressure in a pressure filtering system to provide for drawing off filtered water at any predetermined rate irrespective of the rate of filtering.

Another object of the invention is to provide for controlling the rate at which water in a pressure water treating system is delivered to the filter to regulate the rate of the filtering process.

It is also an object of the invention to provide water cooling and treating apparatus, the parts of which may be readily removed and replaced to maintain the apparatus in proper operating condition at all times.

For a fuller understanding of the nature and objects of the invention, reference may be had to the following detailed description taken in conjunction with the accompanying drawing, in which:

Figure 1 is a view, partly in section and partly in side elevation, of water cooling and treating apparatus constructed in accordance with this invention;

Fig. 2 is a view in side elevation with portions cut away to show details of the structure;

Fig. 3 is a top plan view of the cabinet for housing the treating apparatus; and Fig. 4 is a view, partly in section and partly in side elevation, of a fitting for mounting the filter.

Referring now to the drawing, a cabinet shown generally at 10 of any predetermined size is provided with two chambers 11 and 12. The cabinet may be made from sheet steel or any other suitable material.

The upper chamber 11 is a refrigerant or cooling chamber and is heavily insulated as shown at 13. Many different types of insulating materials are available for insulating the chamber 11. A material sold to the trade as Kaypok has been employed with success.

In order to provide for introducing a refrigerant into the chamber 11, the top of the cabinet is hinged as shown at 14. A lock 15 is provided on the side remote from the hinge 14 for locking the refrigerant chamber.

The size of the refrigerant chamber 11 will depend on the volume of water that it is required to cool in a predetermined time. When the cooler is to be utilized in offices or homes where the volume drawn off in a day is not great, the chamber need only be large enough to contain a fifty-pound block of ice and this will do for several days.

The lower chamber or compartment 12 of the cabinet is not insulated since it is provided merely for housing the apparatus for filtering and storing the filtered water. In order to give access to the chamber 12, a removable panel 16 is provided. This panel is retained in position by means of the hook 17 and latch 18.

A filter 19 is mounted in the compartment 12 between a transverse bar 20 extending across the bottom of the lower compartment and a hinged bracket 21 mounted on the side of the casing, best shown in Fig. 1. A rod 22 provided with a wing nut 23 extends between the bar 20 and the bracket 21 and may be utilized for clamping the filter in position.

The filter 19 may be of any suitable construction and in this instance comprises a cylindrical metal container having fittings 24 mounted on opposite ends. Many different kinds of filtering material may be utilized. The purpose for which the filtered water is to be employed will to some extent govern the filtering material utilized in making the filter. When the sterilized water is to be employed for drinking purposes, a filtering material known to the trade as Sterolite has been found successful. As illustrated, a layer of Sterolite is used in conjunction with a layer of activated carbon. The layer of Sterolite is located above the layer of carbon and next the intake of the filter. "Sterolite" is a zeolite having silver in very finely divided particles deposited thereon.

The quantity of water which will flow through a filter and yet be properly treated will depend on its cross-sectional area. In constructing apparatus suitable for home or office use where a discharge of five gallons per hour is sufficient, a filter barrel about four inches in diameter and sixteen inches long will suffice.

Since this apparatus is to be utilized in conjunction with pressure water systems, it will be readily appreciated that provision must be made for limiting the amount of water delivered to the filter under pressure. In this modification of the invention, in order to limit the flow of water to the filter, a pipe 25 of predetermined diameter is connected between the pressure system and the intake of the filter. For a filter of the size set forth hereinbefore, a copper pipe about one-eighth of an inch inside diameter has been found to be suitable. A pipe of this size so limits the quantity of water that is delivered from the ordinary water pressure system that the filter will have sufficient time for the treating process.

A pressure reservoir or bell 26 is provided in conjunction with the filter 19 for storing filtered water. The reservoir is connected to the discharge end of the filter by a pipe 27. A valve 28 is provided in this pipe for shutting off the flow of water when desired.

In order to make water-tight connections with the intake and discharge ends of the filter 19, fittings 29 are provided on the pipes 25 and 27 which are complementary to the fittings 24 provided on opposite ends of the filter barrel. As best shown in Fig. 4, the fitting 24 has an upwardly extending annular flange which extends into an annular groove provided in the fitting 29 and seats on a gasket 30.

The fitting provided on the end of the pipe 27 is carried by the transverse bar 20 and is rigidly mounted. The fitting provided on the pipe 25 is supported by the hinged bracket 21. In order to permit the removal or insertion of the filter barrel 19, the pipe 25 is provided with a coil 31 which permits the raising of the upper bracket 21 to disengage the upper fitting 29 from the upper fitting 24 so that the barrel may be inclined outwardly and removed from the lower fitting 29.

Leading from the lower end of the reservoir 26 is a pipe 32. It extends upwardly into the insulated chamber 11 and is connected to the cooling coil 33. The cooling coil, as illustrated in Figs. 1 and 2, rests on the bottom of the chamber 11 and carries the block of ice 34. The coil 33 is preferably made from some metal such as copper which has great capacity for conducting heat. The other end of the cooling coil is connected through a pipe 35 to a discharge faucet 36 mounted in the cabinet 10.

A pipe 37 which by-passes the cooling chamber 11 extends from the pipe 32 leading from the reservoir 26 to the pipe 35 and is connected to it at its junction with the faucet 36. A valve 38 is connected in the pipe 37 for controlling the flow of filtered water from the reservoir 26 to the faucet 36. In order to indicate the position the valve 38 stands in, a pointer 39 for operating it is disposed to move over a dial 40 located on the front of the cabinet 10. As shown, the dial indicates "Cool", "Cold", and "Ice".

It is well known that in pressure water systems there are continual pressure surges resulting from the drawing off of water at different points along the line. In order to protect the filter from these pressure surges, and a possible reversal of direction of flow of water through the filter, a check valve 41 is provided in the pipe 25. A reversal of the direction of the flow of water in the filter would stir up the filter beds and interfere with the proper filtering and treating processes.

When the filter barrel is being removed, it is necessary to shut off the water supply, and so a valve 42 is also connected in the pipe 25. This valve 42 is operated in conjunction with the valve 28 in the pipe 27. When these two valves are closed, the filter barrel is completely isolated from the system.

In order to drain off the ice water, a drain pipe 43 is provided which extends through the bottom of the insulated chamber 11. Any suitable means may be provided for catching the water drained from the chamber 11 and in this instance a pail 44 mounted in the apparatus chamber beside the filter 19 is utilized.

A catch basin 45 is mounted on the front of the cabinet 10 below the faucet 36 to catch spilled water and to receive the excess that may be drawn off. A drain pipe 46 leads from the catch basin 45 through the bottom of the insulated chamber 11 and discharges into the pail 44.

As illustrated in Fig. 2, the reservoir 26 is mounted on the side of the cabinet by means of brackets 47. In order to prevent the filtered water from flowing directly through this reservoir, the discharge pipe is extended upwardly about two-thirds of the height of the reservoir. This permits the filtered water to stand in the reservoir for a period of time. This is desirable when filters such as Sterolite are employed.

It has been found that water filtered through Sterolite carries with it some of the germicidal particles or ions and the filtering process continues for some time after the water has left the filter. Consequently, the discharge of the water at a distance from the outlet of the reservoir prevents a direct flow from the filter to the faucet and assures a continuation of the treating process for a period of time after the water leaves the filter and before it is used.

In the operation of the system, the valves 28 and 42 are opened permitting water to flow through the filter 19 discharging it into the reservoir 26. The air trapped in the reservoir is compressed until it reaches a pressure equal to that of the water.

Assuming now that the chamber 11 has been filled with ice, the water cooler is ready for use. If the valve 38 stands closed, and the faucet 36 is operated, water will flow from the reservoir 26 through the pipe 32, cooling coil 33, pipe 35, and is discharged. As the water flows through the cooling coil 33, it is reduced to substantially the temperature of the ice.

If it is desired to draw off water at a higher temperature than that of the ice, the dial 39 is set at some other position. The moving of the dial to another position either completely or partially opens the valve 38, and if the faucet is again operated, water will flow from the reservoir through two circuits. One circuit will be that traced hereinbefore through the cooling coil. The other circuit will be from the pipe 32 through the pipe 37, valve 38, to join the cooling coil circuit at the faucet. The water now discharged is a mixture of filtered water from the water system and filtered and cooled water conveyed through the cooling coil circuit.

The water may be drawn off at a greater rate than that at which it is filtered, since the pressure built up in the reservoir 26 will cause water to flow from it rapidly. The amount of water stored in the reservoir will be enough to take care of immediate demands. After the demand for water has been supplied at a particular time, the filtering process will continue until the reservoir is partly filled again.

Thus it will be seen that a water cooling and treating apparatus has been provided which is very flexible, and which carries on the filtering process at the proper rate, irrespective of the periodic demands, thus allowing the treating of the water for a sufficient time.

If the water cooling and treating apparatus is used regularly, it may be desirable to replace the filter barrel 19 about once a month. This may be done by the delivery man who brings the ice. To remove the filter barrel, the wing nut 23 is removed, allowing the bracket 21 to be swung upwardly, releasing the upper end of the barrel which may then be lifted out. The mounting of a barrel is done in the reverse manner of the removal operation.

Since numerous changes may be made in the above described structure and different embodiments of the invention may be made without departing from the spirit and scope thereof, it is intended that all matter contained in the above description or shown in the accompanying drawing shall be interpreted as illustrative and not in a limiting sense.

I claim:

1. In water cooling and treating apparatus for use with pressure water supply systems, in combination, a cabinet having a plurality of chambers, filter removably mounted in the cabinet, a pipe of predetermined cross-sectional area connecting the intake end of the filter and the supply system, said pipe being coiled to render it flexible, a pressure reservoir, a pipe connecting the pressure reservoir to the discharge end of the filter, complementary fittings mounted on the end of the filter and pipes for making water-tight joints and facilitating the mounting and removal of the filter, means for discharging the filtered water from the reservoir, and cooling coils associated with said discharge means to cool a portion or all of the water discharged.

2. In water cooling and treating apparatus for use with pressure water supply systems, in combination, a filter for treating the water, a pipe of predetermined cross-sectional area for delivering the water to the filter at its rated capacity, a check valve connected in the pipe to protect the filter against pressure surges in the supply systems and to prevent a reversal of the direction of flow of the water through the filter, a pressure reservoir connected to the filter to store filtered water, and means for drawing off the filtered water. the reservoir cooperating with the filter to supply water at a greater rate to the means for drawing it off than it is filtered.

3. In water cooling and treating apparatus for use with pressure water supply systems, in combination, a cabinet having a plurality of chambers, means for insulating one of said chambers to adapt it for storing a refrigerant, a filter mounted in another chamber, a pipe of predetermined diameter connected between the supply system and the intake of the filter, a check valve connected in the pipe for controlling the direction of flow of water through the filter, a pressure storage reservoir for the filtered water connected to the discharge end of the filter, a cooling coil mounted in the insulated chamber and connected to the reservoir, a water line by-passing the insulated chamber and cooling coil connected to the pressure storage reservoir, means for drawing off filtered water, and means associated with the drawing off means for effecting the delivery of either cooled or uncooled filtered water or a mixture of them to provide water of a predetermined temperature.

4. In water cooling and treating apparatus for pressure systems in combination, a filter for filtering water at a predetermined rate, means connected to the filter and disposed to be connected to a pressure water system to control the flow of water, said flow control means being designed relative to the pressure system to deliver the water at substantially the capacity rate of the filter to provide for the proper functioning of the filter, and a pressure reservoir for storing water at the pressure of the pressure system and for delivering water at substantially the pressure of the water system independently of the flow of water through the filter thereby when water is drawn off it may be delivered under pressure at a greater rate than it is filtered.

5. Water cooling and treating apparatus for use with pressure water systems comprising in combination, a chamber for a refrigerant, cooling coils in the chamber, a filter for treating the water connected between the water system and the cooling coils, means connected to the filter and disposed to be connected to a pressure water system to control the flow of water, said flow control means being designed relative to the pressure system to deliver the water at substantially the capacity rate of the filter to provide for the proper functioning of the filter, and a pressure reservoir for storing water at the pressure of the pressure system and for delivering water at substantially the pressure of the water system independently of the flow of water through the filter thereby when water is drawn off it may be delivered under pressure at a greater rate than it is filtered.

6. In water cooling and treating apparatus for use with pressure water supply systems, in combination, a cabinet having a cooling chamber therein, a filter disposed in the cabinet, means for connecting the filter to a source of pressure water supply, said connecting means being adapted to restrict the flow of water to the filter to substantially its rated capacity, a pressure reservoir connected to the discharge end of the filter for storing filtered water under pressure, a heat exchange means disposed in the cooling chamber in the cabinet and connected to the pressure storage reservoir, means for drawing off water under pressure from the pressure reservoir connected to the heat exchange means thereby making available water which has been filtered and cooled.

7. In water cooling and treating apparatus for use with pressure water supply systems, in combination, a cabinet, a filter disposed in the cabinet, means for connecting the filter to a source of water supply, said means being adapted to restrict the flow of water to the filter to substantially its rated capacity, a pressure reservoir connected to the discharge end of the filter for storing water under pressure, means for drawing off water from the pressure reservoir and discharging it under pressure providing a continuous pressure system from the pressure water supply system to the drawing off means, and means for cooling the water associated with the water drawing off means to change the temperature of the water.

AUSTIN GUDMUNDSEN.